US009712885B2

(12) United States Patent
Leung et al.

(10) Patent No.: US 9,712,885 B2
(45) Date of Patent: Jul. 18, 2017

(54) TECHNIQUES TO SELECT ADVERTISEMENTS USING CLOSED CAPTIONING DATA

(71) Applicant: CBS Interactive Inc., San Francisco, CA (US)

(72) Inventors: Steven Leung, San Francisco, CA (US); Hanson Wong, San Francisco, CA (US)

(73) Assignee: CBS Interactive Inc., New York, NY (US)

( * ) Notice: Subject to any disclaimer, the term of this patent is extended or adjusted under 35 U.S.C. 154(b) by 0 days.

(21) Appl. No.: 14/215,606

(22) Filed: Mar. 17, 2014

(65) Prior Publication Data
US 2015/0264446 A1    Sep. 17, 2015

(51) Int. Cl.
| H04H 60/32 | (2008.01) |
| H04N 21/488 | (2011.01) |
| H04N 21/44 | (2011.01) |
| H04N 21/278 | (2011.01) |
| H04N 21/482 | (2011.01) |
| H04N 21/81 | (2011.01) |
| H04N 21/8405 | (2011.01) |
| H04N 21/4788 | (2011.01) |
| H04N 21/234 | (2011.01) |
| H04N 21/4782 | (2011.01) |
| H04N 21/61 | (2011.01) |
| H04N 21/262 | (2011.01) |
| H04N 21/258 | (2011.01) |
| G06Q 30/02 | (2012.01) |
| H04N 5/445 | (2011.01) |

(52) U.S. Cl.
CPC ......... *H04N 21/4884* (2013.01); *G06Q 30/02* (2013.01); *H04N 21/23424* (2013.01); *H04N 21/25866* (2013.01); *H04N 21/26241* (2013.01); *H04N 21/278* (2013.01); *H04N 21/44008* (2013.01); *H04N 21/4782* (2013.01); *H04N 21/4788* (2013.01); *H04N 21/4828* (2013.01); *H04N 21/6125* (2013.01); *H04N 21/812* (2013.01); *H04N 21/8405* (2013.01); *H04N 2005/44521* (2013.01)

(58) Field of Classification Search
CPC ..................... H04N 21/4428; H04N 21/812
See application file for complete search history.

(56) References Cited

U.S. PATENT DOCUMENTS

| 2009/0276402 A1* | 11/2009 | Stiers ....................... H04N 5/76 |
| 2011/0078723 A1* | 3/2011 | Stettner ................... G06Q 30/02 725/32 |
| 2014/0046661 A1* | 2/2014 | Bruner ............... H04N 21/4884 704/235 |

\* cited by examiner

*Primary Examiner* — Olugbenga Idowu

(57) ABSTRACT

An apparatus to decode closed captioning data from video data and receive advertisement according to the decode closed captioning data includes a processor circuit; and a video display component for execution on the processor circuit to receive video data from a media server, the video data including closed captioning (CC) data. The apparatus further includes a CC decoder component for execution on the processor circuit to decode the CC data to obtain text; and an ad requesting component for execution on the processor circuit to: parse the text to obtain words; provide the words to the media server; receive an advertisement from the media server; and display the advertisement.

18 Claims, 15 Drawing Sheets

TECHNIQUES TO SELECT ADVERTISEMENTS USING CLOSED CAPTIONING DATA

BACKGROUND

Advertising revenue remains an important component of content provision on the Internet and on other forms of media. As consumers are presented with an increasing number of advertisements, advertisers work to identify ads that are relevant to the consumer and thus more likely to receive attention. Additionally, consumers generate a great deal of data about themselves, as they view and produce content, make purchases, and otherwise interact with online data, that advertisers may use to target relevant ads. It may, however, be difficult to determine what may be relevant to a consumer at a particular moment.

DETAILED DESCRIPTION

Figure 1:
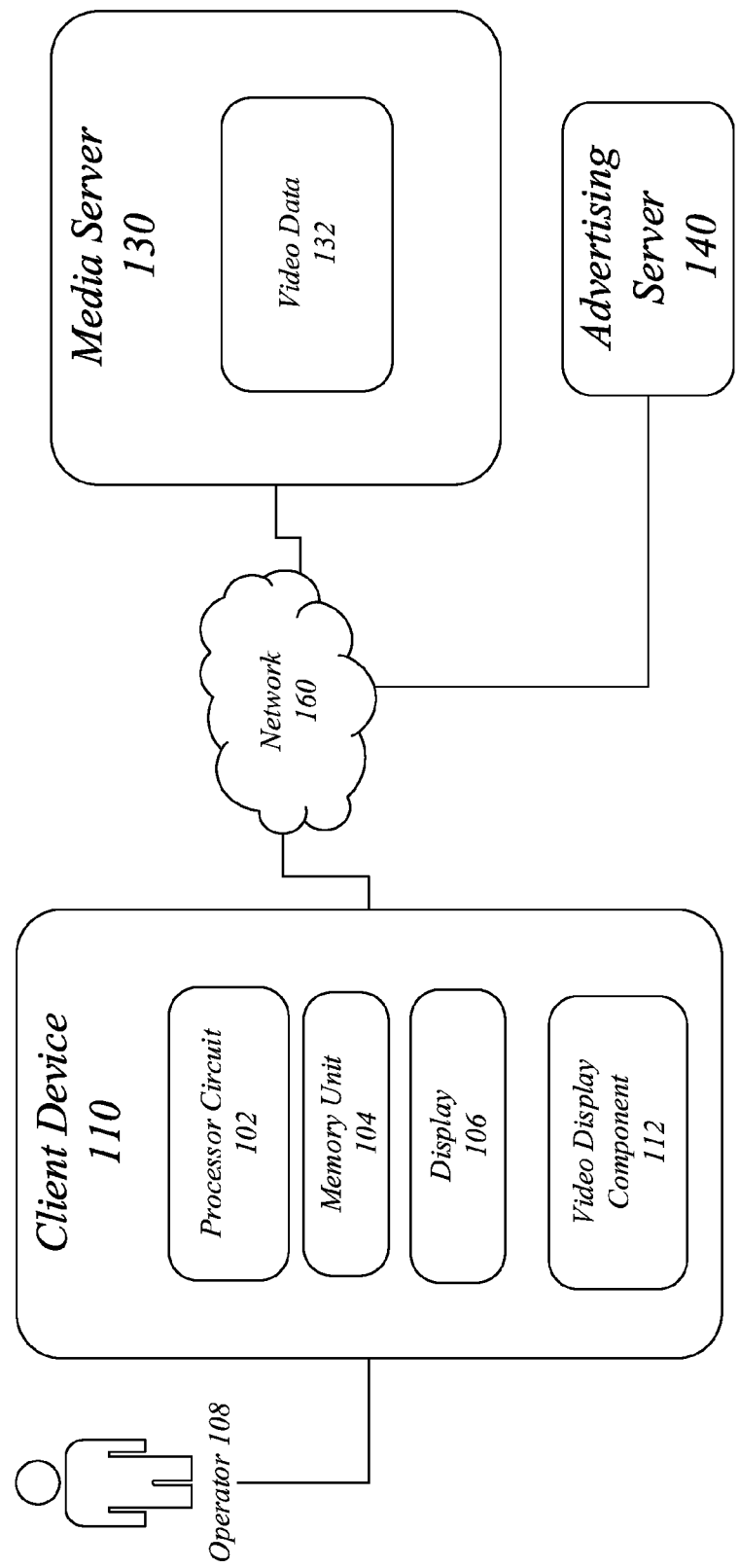
FIG. 1 illustrates an embodiment of a system for using closed captioning data to select and serve advertisements.

Various embodiments are directed to techniques to select advertisements, using closed captioning data, to present to a viewer. In particular, various embodiments make use of the closed captioning data that is included in most broadcast video data to select advertisements that may be relevant or connected to what is occurring in a playing video segment.

Closed captioning is text data that is included in most video data presented on television, and increasingly, in motion pictures, and is intended to allow people with hearing impairments to understand the audio content of a video presentation. Closed captioning (CC) is similar to subtitles, although usually designed specifically with the hearing impaired in mind. CC data includes a transcription of audio information of the video, typically dialog, and may also include information about non-speech audio occurrences such as sounds and music. The transcription may be a nearly verbatim text version of what is spoken in the video, and/or may summarize the dialog. As of 1996 in the United States, video programming distributors are required to close caption their television programs. Television sets are required to include a decoder to decode and display the CC data.

When video content, e.g. a television (TV) program or a movie, is shown on a TV through a content provider such as a cable or satellite TV signal provider, advertisements (ads) are typically inserted at set points in the video content. The ads are selected according to contracts between the content providers and the advertisers. In TV broadcast environments, the advertiser and the network usually have no specific data about an individual watching a program. General demographics and numbers of viewers may be estimated by ratings companies, but more specific information is not usually available.

When video content is shown on a computer, e.g. in a video viewing application or on a web page, the video content is usually requested by a specific user about whom more is potentially known. CC data contained within a specifically requested video may therefore be a useful and inexpensive source of information about what a viewer is watching, and may provide additional context for an advertiser in selecting what ad to show to the viewer. With these in mind, embodiments provide a method of decoding and parsing CC data into words that can be used directly or indirectly to select an advertisement to display to the viewer of the video data containing the CC data.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or system for performing these operations. This apparatus may be specially constructed for the specified purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100 for using closed captioning data to select and serve advertisements. In one embodiment, the system 100 may comprise a computer-implemented system 100 having various elements, such as a client device 110, a media server 130, an advertising server 140, and a network 160. Although the system 100 shown in FIG. 1 has a limited number of elements in a certain topology, it may be appreciated that the system 100 may include more or fewer elements in alternate topologies as desired for a given implementation.

The system 100 may include one or more media servers, such as media server 130. Media server 130 may store and transmit video data 132, for example, to a client device 110 via network 160. Video data 132 includes closed captioning data and is described in more detail with respect to FIG. 2. Media server 130 may be operated by any content provider, for example and without limitation, a television network, a cable television provider, a satellite television provider, a movie studio, a multimedia web site, and so forth. Media server 130 may be directly accessible, for example, through a web site having a public uniform resource locator (URL) or may be indirectly accessible via another entity, such as an Internet Service Provider (ISP), cable television provider, or an entity at a different URL. The embodiments are not limited to these examples.

A media server 130 may comprise one or more electronic devices capable of receiving, processing, and sending information for the system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The system 100 may comprise a client device 110. Client device 110 may be usable by an operator 108 to request and view video data 132 from media server 130. Client device 110 may include any electronic device as described above.

Client device 110 may execute processing operations or logic for the system 100 using a processor circuit 102.

Processor circuit 102 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Client device 110 may include one or more memory units 104. A memory unit 104 may include various computer-readable storage devices, volatile and non-volatile, that store data and instructions for retrieval by processor circuit 102. As used herein, a memory unit 104 does not include signals or carrier waves, such as electromagnetic or optical waves. Memory units are described further with respect to FIG. 15.

Client device 110 may include a display 106. Display 106 may be integrated into electronic device 110, or may be separate but communicatively coupled to electronic device 110. Display 106 may include a touch-sensitive surface that can detect a touch gesture or a proximity gesture, which may include contact with, or proximity to, items such as a human fingertip, a stylus, an electronic pen, and so forth. Display 106 may also include conventional computer monitors or integrated laptop computer screens.

Client 110 may include a video display component 112. Video display component 112 may comprise hardware and software that is capable of receiving video data 132 and displaying the video data on display 106. As used herein, displaying video data comprises displaying images that make up the video data in a sequence at a specified frame rate so as to produce a motion picture. Video display component 112 may include, for example, a web browser application that can display video data, or a stand-alone video or multimedia application that can display video data. Video display component 112 may also include hardware and/or software to decode, decrypt, or otherwise process video data 132 to display video data 132 in human viewable form.

The system 100 may include one or more advertising servers, such as advertising server 140. Advertising server 140 may be an electronic device capable of communicating with media server 130 and/or client device 110 to receive a request for an advertisement and transmit an advertisement to client device 110 for display by video display component 112.

Figure 2:
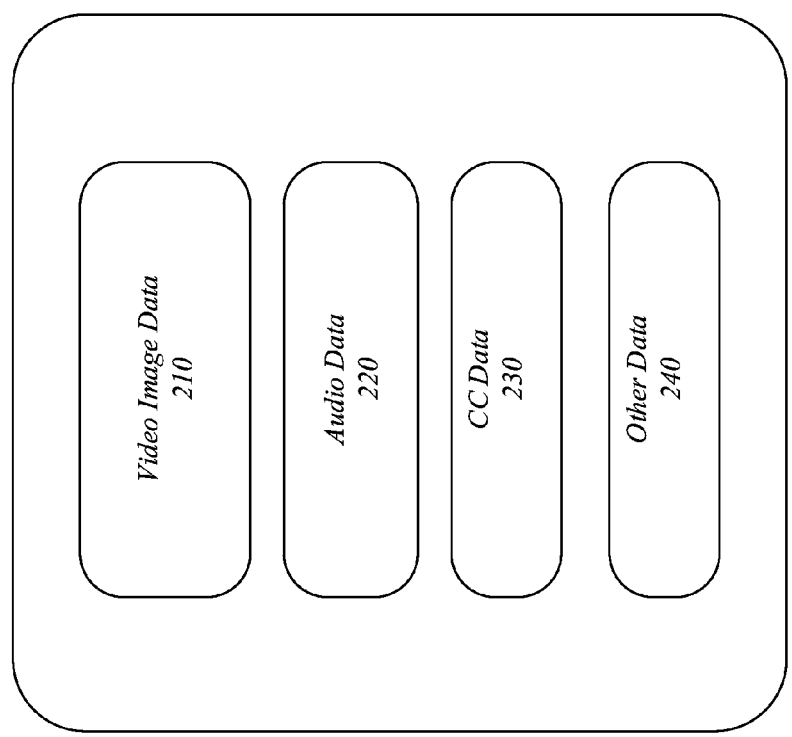
FIG. 2 illustrates an embodiment of video data.

FIG. 2 illustrates an embodiment of video data 200. Video data 200 may represent video data 132. Video data 200 may include several types of data, for example, and without limitation, video image data 210, audio data 220, closed captioning (CC) data 230, and other data 240. One file of video data 200 may include all of the information needed to display a discrete set of content, such as one movie, one television show, one video clip, and so forth.

Video image data 210 may include the individual images that, when displayed sequentially at a specified frame rate, produce the motion picture (also known as a movie, a video, a TV show, a music video, and so forth). Video image data 210 may be encoded to reduce the amount of data needed to represent the video, and may accordingly also include compression information to allow the video image data 210 to be decoded and displayed.

Audio data 220 may include all of the sounds that are a part of a video file. The sounds may have been recorded at the time that the video image data 210 was captured, and/or may have been added at a later phase of video production.

Audio data 220 may include without limitation, spoken dialog, music, ambient sounds, sound effects, laugh tracks, and so forth.

CC data 230 may include the closed captioning data generated from the audio data 220. CC data 230 may include a text representation of the spoken dialog, and text descriptions of non-spoken sounds.

Other data 240 may include any other information that may be added to video data 200 that is not specifically needed to render the video file. Other data 240 may include, for example, metadata about the content of a video file, such as title, synopsis, primary actors, and keyword identifiers. Other data 240 may also include timing signals or other information usable by content providers to insert content such as advertisements at appropriate points in the transmission. For example, other data 240 may include a vertical blanking interval that is used as part of a television signal. In broadcast television, CC data 230 is usually included or inserted into the "line 21" data area of the vertical blanking interval. The blanking interval of the television signal tells the display to begin painting the next frame of video data. Line 21 is the line in the vertical blanking interval that has been assigned to captioning, and may also include time and V-chip information. Two characters of closed captioning information may be transmitted with each frame of video image data.

Figure 3:
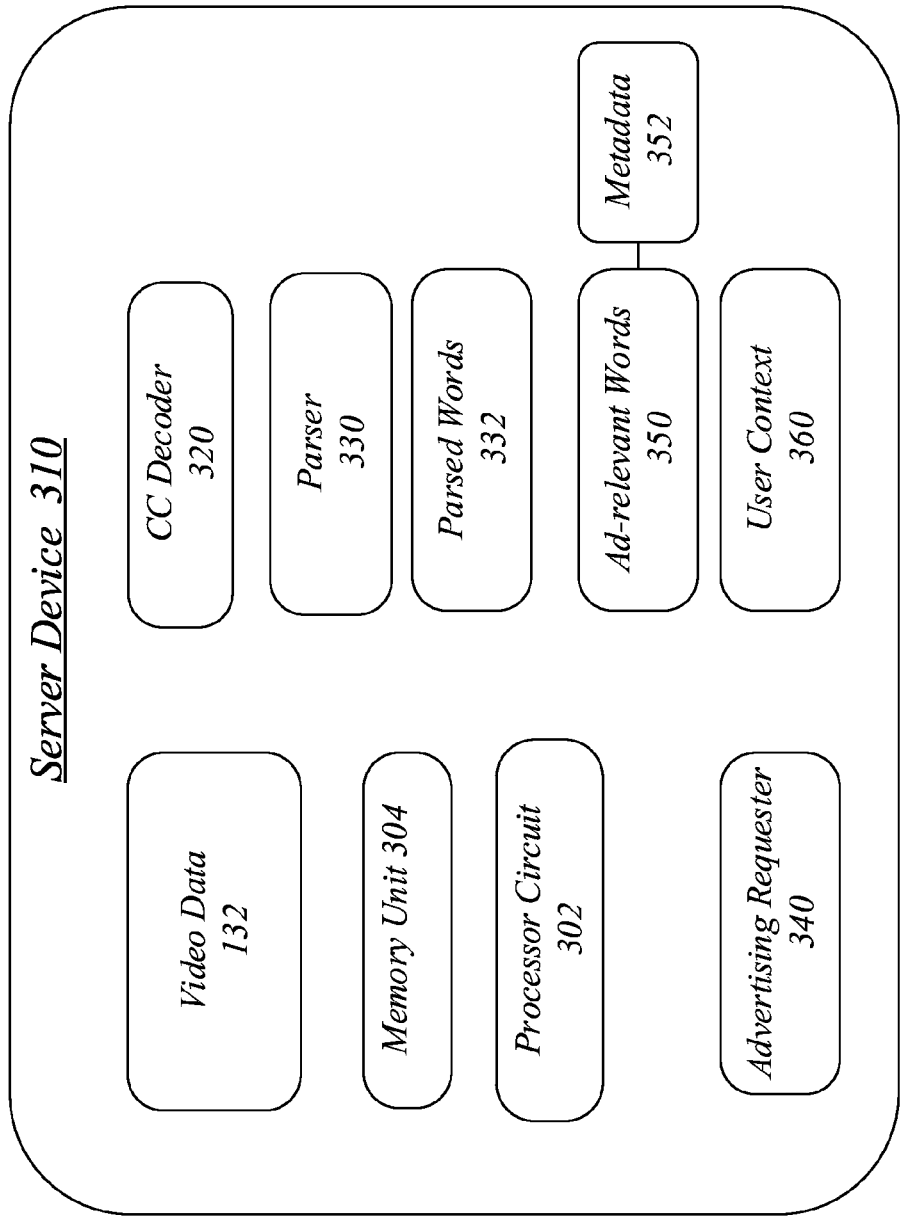
FIG. 3 illustrates an embodiment of an operating environment.

FIG. 3 illustrates an embodiment of an operating environment 300. Operating environment 300 may comprise a server device 310. Server device 310 may be a representative example of media server 130. Server device 310 may include a processor circuit 302 and a memory unit 304, which may be analogous to processor circuit 102 and memory unit 104. Server device 310 may also store video data 132.

Server device 310 may include various functional components that allow it to use CC data to select or request advertisements to display on a client that is displaying video data 132. The functional components may include, for example, a CC decoder 320, a parser 330 and an advertising requester 340. More, other, or fewer functional components may be used. Server device 310 may also use and/or generate data, such as ad-relevant words 350 and user context 360. More, other, or fewer types of data may be used.

CC decoder 320 may include a hardware and/or software component that receives video data that contains CC data, e.g. video data 200 and CC data 230, and can decode the CC data into text. Decoding CC data is generally well known, and includes finding the CC data in the video data, e.g. in the "line 21" data. The line 21 data may include three start bits followed by two 8-bit characters of text. Decoding the CC data thus may include identifying a starting point in the line of CC data for each of the two characters in the line, and decoding the bits to characters to retrieve the text.

Parser 330 may receive the decoded CC data text and may divide the text into individual words. For example, parser 330 may use blank space characters and punctuation characters to determine where a word begins and ends. In some embodiments, parser 330 may discard punctuation characters, and words that do not convey content, such as prepositions, articles, pronouns, and conjunctions. The retained parsed words 332 from parser 330 may be provided to advertising selector 340 for use in selecting an advertisement to display.

Advertising requester 340 may receive the parsed words 332 from parser 330. Advertising requester 340 may pass the words 332 and a request for an advertisement to an advertising server, e.g. advertising server 140. For example, if the word "motorcycle" appears in the parsed words 332, advertising server 140 may select an advertisement for a motorcycle, a motorcycle dealership, or a motorcycle accessory.

In some embodiments, advertising requester 340 may compare the parsed words 332 to ad-relevant words 350 and may retain only the words that also appear in ad-relevant words 350. Ad-relevant words 350 may comprise a list, database, set, or other data collection of words that are more useful in determining a context that is related to an advertisement. Ad-relevant words 350 may include brand names, proper names, or other specific words that an advertiser wants to relate to an advertisement. In some embodiments, an advertising service may provide some or all of ad-relevant words 350 to server device 310. Ad-relevant words for a soft drink may include, for example and without limitation: soda, pop, thirsty, beverage, COKE®, refreshing, and soft drink. The ad-relevant words 350 may be more generally a list of nouns and action verbs from the CC data, for example. When an ad-relevant word or words appears in the CC data, advertising requester 340 may pass only the ad-relevant words to an advertising server.

Ad-relevant words 350 may be associated or linked to metadata 352. Metadata 352 may include, for any particular ad-relevant word, one or more words that may provide more information about the particular ad-relevant word. Metadata 352 may include, for example, words that often appear in proximity to an ad-relevant word and that may provide a context that indicates the intended meaning of the word, for example, when an ad-relevant word has more than one meaning. For example, an ad-relevant word "tablet" may have metadata associated with it such as "computer," "device," "portable," "turn on," and other words that, when in proximity to the word "tablet," indicate that the tablet is a portable computing device, and not, for example, a medication in tablet form, or an ancient stone tablet.

Advertising requester 340 may use user context 360 in conjunction with the parsed words 332 to request an advertisement. User context 360 may include any information known or inferred about the user, e.g. operator 108, that requested the video data 132. User context 360 may include, for example, and without limitation, information in a user account held by the user on server device 310; a history of interactions between the user and server device 310, such as other video data 132 viewed, other non-video content viewed, purchases made, searches performed, and companion content on a web site where video data 132 is being served; social network data from the user; user demographic data about the user; and browser application history data.

For example, if the word "car" appears in the parsed words 332, user context 360 may be used to determine the user's income bracket, which may cause an advertisement for a luxury car to be selected for a higher income bracket user and an advertisement for an economy car to be selected for a lower income bracket user. User context 360 may include, for example, luxury goods companies "liked" in a social networking environment, frequent visits to web sites for expensive products, searches for high-end goods or services, and so forth. User context 360 may also include more general demographic data from the video data provider about target audiences for a specific item of video content.

Figure 4:
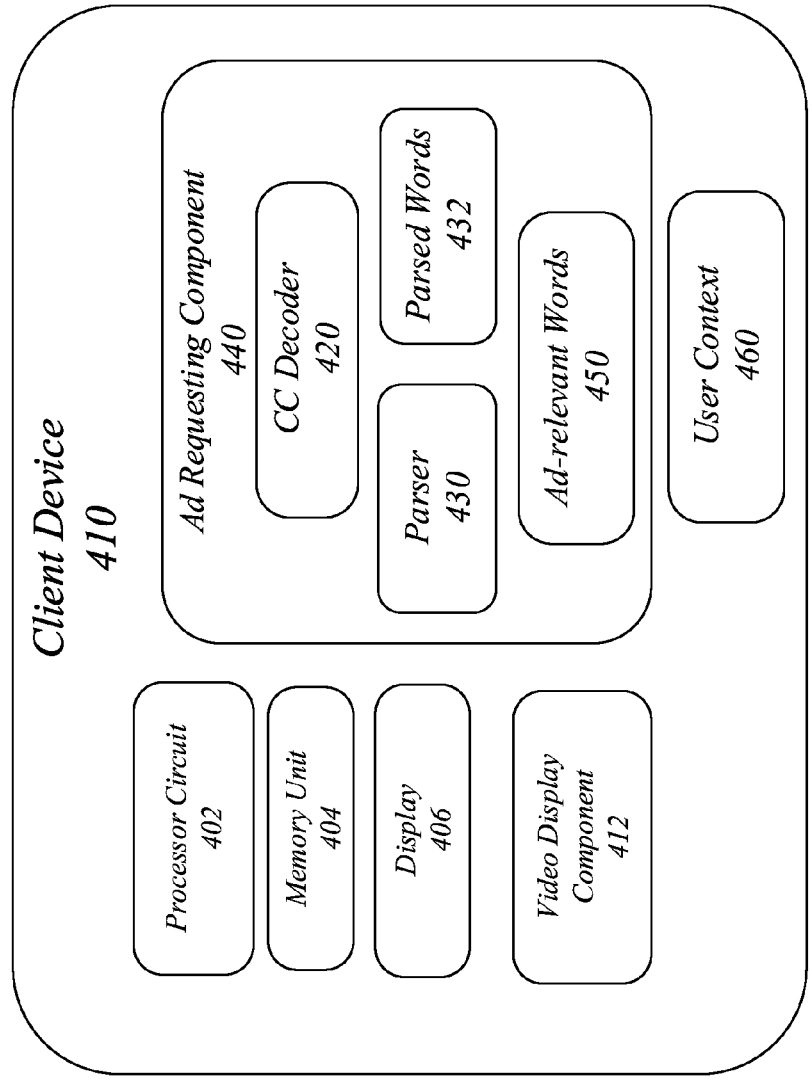
FIG. 4 illustrates an embodiment of a second operating environment.

FIG. 4 illustrates an embodiment of an operating environment 400. Operating environment 400 may illustrate a more detailed block diagram for a client device 410. Client device 410 may represent an embodiment of client device 110.

As shown in FIG. 4, client device 410 may include a processor circuit 402, memory unit 404 and a display 406, which may be analogous, respectively, to processor circuit 102, memory unit 104 and display 106. Client device 410 may also include a video display component 412, which may be analogous to video display component 112.

In operating environment 400, client device 410 may perform the closed captioning decoding and parsing for advertising purposes, instead of a media server. To that end, client device 410 may include an ad requesting component 440. Ad requesting component 440 may include various functional components, such as CC decoder 420 and parser 430.

As video display component 412 receives video data, e.g. video data 200, CC decoder 420 may decode the CC data in video data 200 into text, as described with respect to CC decoder 320. Parser 430 may parse the text into parsed words 432, as described above with respect to parser 330.

Parser 430 may retain in parsed words 432 only words that appear in ad-relevant words 450, which may be analogous to ad-relevant words 350, as described above with respect to parser 330 and ad-relevant words 350.

Ad requesting component 440 may send a request for an advertisement with the parsed words 432 to the media server supplying the video data, or to an advertising server. Ad requesting component 440 may receive an advertisement and provide the advertisement to video display component 412 for display.

Ad requesting component 440 may use user context 460 to generate parsed words 432, or to provide additional parameters in a request for an advertisement. User context 460 may include some similar elements as compared to user context 360, however user context 460 may be restricted to information that is local to client device 410 and specific to the user or users of client device 410, such as social network data from the user; and browser history data.

Although ad requesting component 440 is depicted as being separate from video display component 412, in another embodiment, video display component 412 may include instructions for performing the functions of ad requesting component 440. Alternatively, the instructions may be stored on a server, such as media server 130, and included in a web page loaded and displayed by video display component 412, which may also execute the instructions when the web page is loaded and displayed, and when video data is received.

Figure 5:
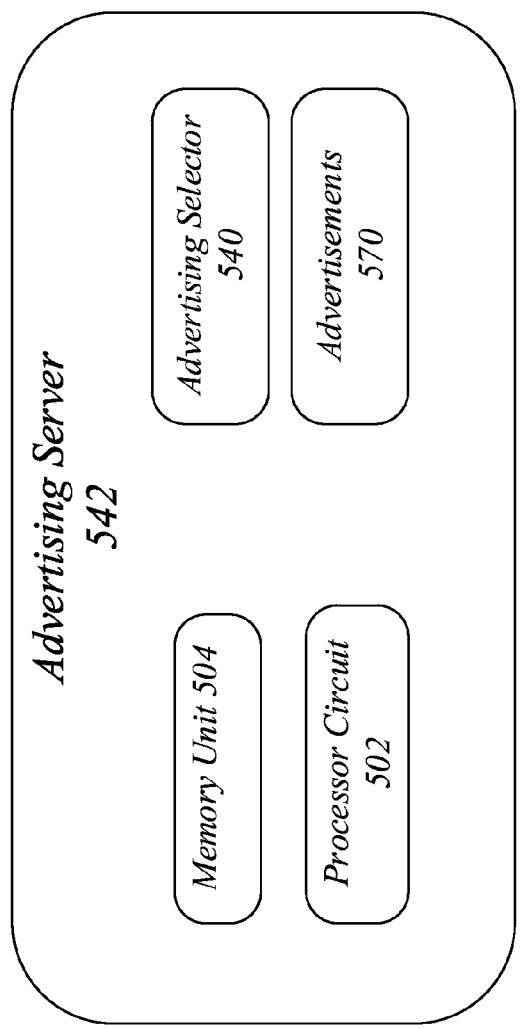
FIG. 5 illustrates a second embodiment of a third operating environment.

FIG. 5 illustrates an embodiment of an operating environment 500. Operating environment 500 may comprise an advertising server 542, which may be an example of advertising server 140. Advertising server 510 may include a processor circuit 502 and a memory unit 504, analogous to processor circuit 102 and memory unit 504.

Advertising server 510 may include an advertising selector 540. Advertising selector 540 may include logic to receive words and user context, for example, from a server device 310 or a client device 410. Advertising selector 540 may further include logic to use the received words (and context) to select an advertisement 570.

In an embodiment, advertising selector 540 may perform a keyword match between a received word from CC data, and an advertisement 570 associated with a keyword. For example, if a received word is "tablet," advertising selector 540 may select an advertisement for a tablet computer or for a store that sells computing products.

In an embodiment, advertising selector 540 may use both a word or words from the CC data and the user context to select an advertisement. For example, if the word is "tablet" and user context indicates that the user has recently purchased software for a MAC® computer from APPLE INC., an advertisement for a iPAD tablet, also from APPLE, may be selected, while an advertisement for a non-APPLE tablet may not be selected.

Advertisements 570 may generally include advertisements in any form that may be transmitted to and displayed by a video display component 112 or 412. For example, the advertisements 570 may be static images, text, dynamic images, videos, and so forth.

Figure 6:
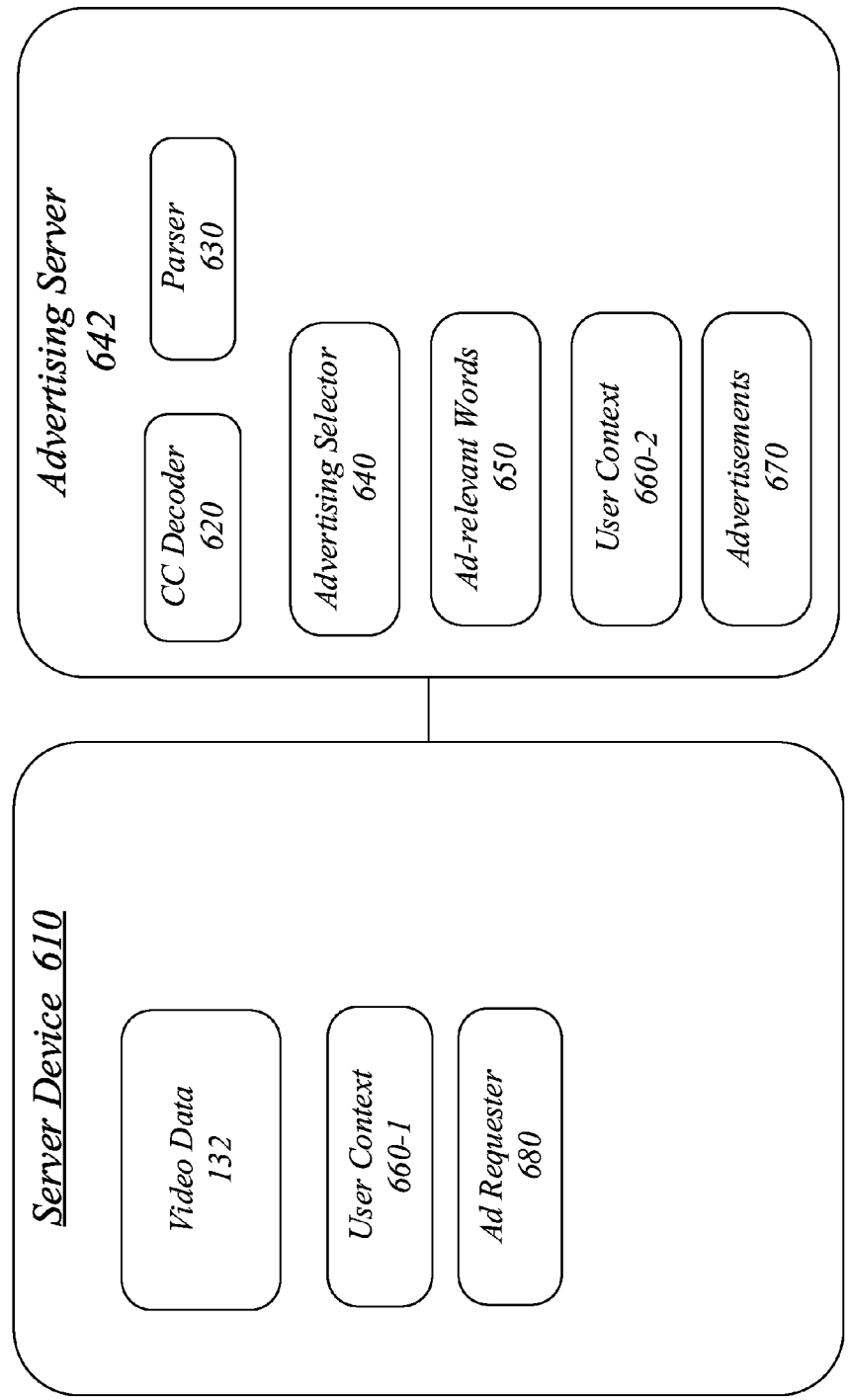
FIG. 6 illustrates an embodiment of a fourth operating environment.

FIG. 6 illustrates an embodiment of an operating environment 600. Operating environment 600 may represent an environment for system 100 where the advertising server, e.g. advertising server 642, performs the decoding of CC data and subsequent advertisement selection.

Operating environment 600 may include a server, e.g. server device 610. Server device 610 may be an example of media server 130. Operating environment 600 may also include advertising server 642, which may be an example of advertising server 140. Both servers 610 and 642 may include processor circuits and memory units as described with respect to earlier figures, but omitted here for brevity.

Server device 610 may store and serve video data 132. Server device 610 may also include an ad requester 680. Ad requester 680 may operate to create and maintain a connection to advertising server 642 to provide video data 132, and to prompt advertising server 642 to provide advertisements to any client device consuming video data 132 from server device 610.

Server device 610 may also store or have access to user context 660-1. User context 660-1 may include user context information obtained directly and/or aggregated from users who interact with server device 610, such as viewing history, social network data, companion content, and so forth. Server device 610 may provide the user context 660-1 to advertising server 642 with access to video data 132.

Advertising server 642 may receive or have access to video data 132 and may perform decoding and parsing of the included CC data directly. Accordingly, advertising server 642 may include a CC decoder 620 and a parser 630, which may function analogously to CC decoders 320 and 420, and parsers 330 and 430, respectively.

Advertising server 642 may also include an advertising selector 640 which may select advertisements from advertisements 670 by using, at least in part, words extracted from the CC data in video data 132, and user context 660-1.

In an embodiment, advertising server 642 may have its own list of ad-relevant words 650. Advertising selector 640 may compare words extracted from CC data to words in ad-relevant words 650 and when the extracted words are found in ad-relevant words 650, those found words may be used to select an advertisement 670.

Advertising selector 640 may also use user context 660-2 to select advertisements. User context 660-2 may include aggregated or more general user context information, such as viewer demographics for some video content, including, for example, age range, gender, and income level for the typical viewer of a given item of video content.

In various embodiments, ad requester 680 and/or advertising selector 640 may disambiguate words using CC data in conjunction with metadata associated with ad-relevant words, e.g. metadata 352. For example, if "bike" appears in the parsed words, it may not be clear if "bike" means motorcycle or bicycle. If CC data near the use of "bike" includes word that are also in the metadata associated with "bike," for example, words for brand names of motorcycles, or non-dialog words such as "sounds of motor revving," the meaning of "motorcycle" may be determined. Alternatively, or additionally, various known language processing techniques may be used to disambiguate the meaning of an ad-relevant word using the surrounding word context.

Figure 7:
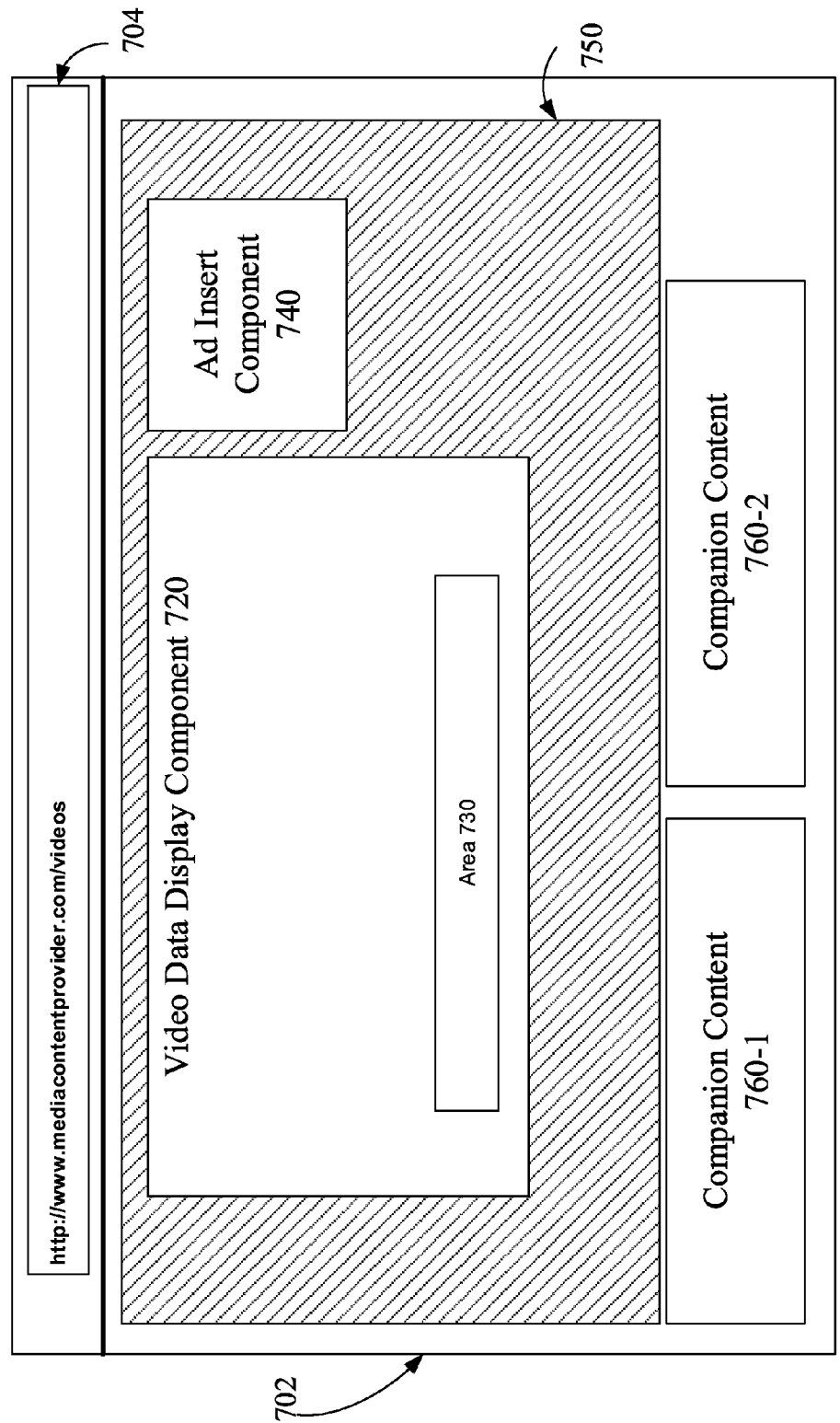
FIG. 7 illustrates an embodiment of a graphical user interface.

FIG. 7 illustrates an embodiment of a graphical user interface (UI) 700. The UI 700 may be a component of video display component 112. In an embodiment, where video display component 112 is a web browser application, UI 700 may be presented in the web browser. Alternatively, the UI 700 may be a component of an application, for example, a stand-alone media player application (not shown) that allows an operator 108 to request and view video data 132 from media server 130 from client device 110. The embodiments are not limited to these examples.

As shown in FIG. 7, UI 700 may include a window 702 and may have a source bar 704. Source bar 704 may display the address, location, URL or other source indication of video data 132. UI 700 may further include a video data display component 720 where video data 132 may be displayed, e.g. where a video is played. Video data display component 720 may also include control UI elements (not shown) for starting, pausing, rewinding, fast forwarding and otherwise allowing the user to control the display of requested video data.

Video data display component 720 may include an area 730 for CC data. If the CC data is being decoded for viewing, the CC text will be displayed in area 730. Of note is that the video data being displayed in video data display component 720 includes CC data regardless of whether the user has turned on closed captioning display. Advertisements may be displayed in video data display component 720, for example, in between segments of a television program, as interruptions in movies, and/or in between video clips.

UI 700 may include an ad insert component 740. Ad insert component 740 may include an area in UI 700 where advertisements may be displayed, separate from video data display component 720. Advertisements displayed in ad insert component 740 may be static, e.g. still images, or moving, e.g. videos or GIFs.

UI 700 may include a background 750. Background 750 may be used to display an advertisement behind video data display component 720 and ad insert component 740. An advertisement displayed in background 750 may be partially obscured by either video data display component 720 or ad insert component 740. Background 750 may span all of window 702 or may cover only a portion of window 702.

Advertisements displayed in video data display component 720, ad insert component 740, and background 750 may be related, e.g. for the same product or service, or unrelated each other. The advertisements displayed in any of video data display component 720, ad insert component 740, and background 750 may be changed at the same time, or at different times with respect to advertisements displayed in the other UI elements.

UI 700 may also include companion content areas where companion content such as companion content 760-1 and 760-2 may be displayed. Companion content 760 may include, for example and without limitation, content related to the video data being displayed in video data display component 720, such as articles, reviews, related video clips, interviews with actors in the video data, commentary, and previews of upcoming episodes. Companion content 760 may also include a viewing history of video data that was previously viewed on client device 110 and/or by the same user. Companion content 760 may include content consumed, e.g. viewed, by others who also watched the currently playing video data. In various embodiments, companion content 760 may be used to determine a user context, such as user context 360.

Figure 8:
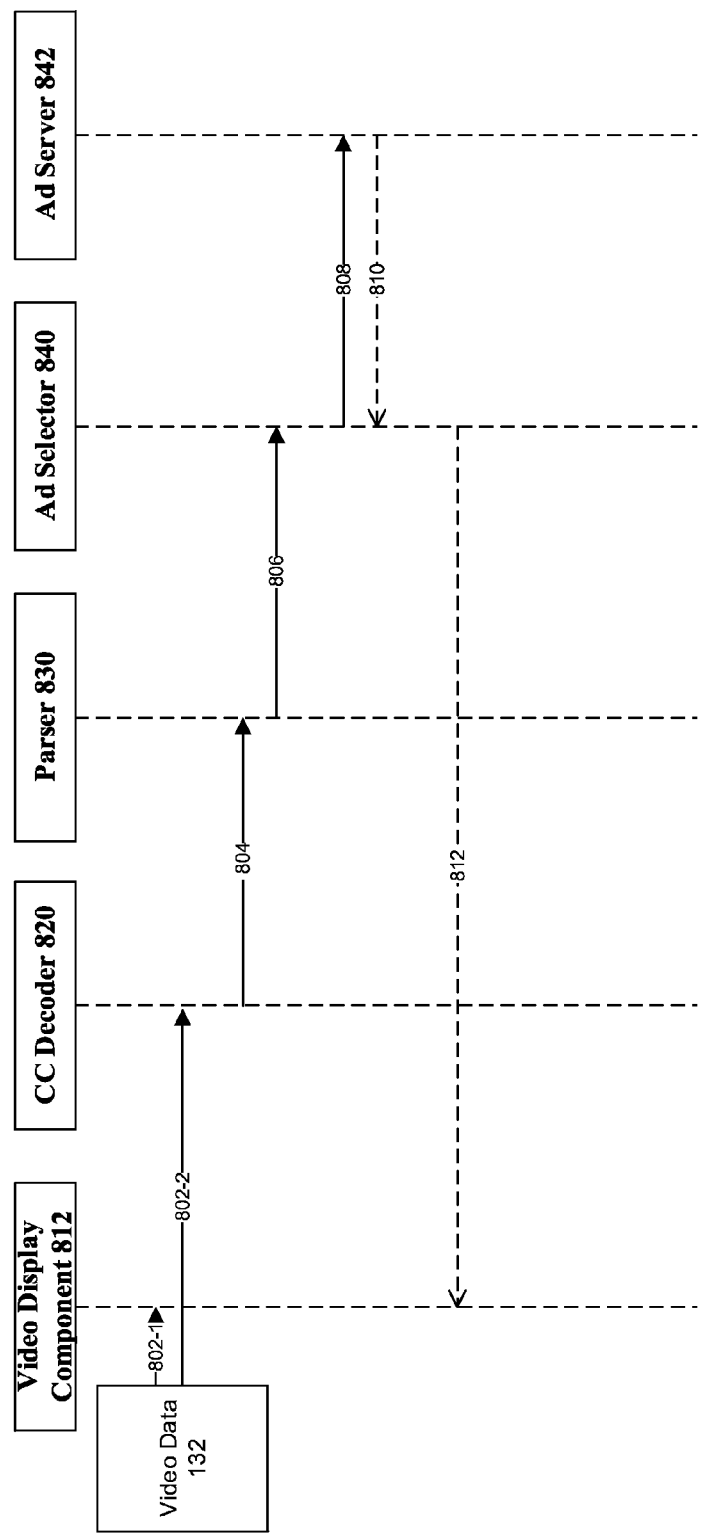
FIG. 8 illustrates an embodiment of a message flow.

FIG. 8 illustrates an embodiment of a message flow 800. Message flow 800 may represent messages communicated among the components of system 100. In particular, message flow 800 may occur among a video display component 812, a closed captioning (CC) decoder 820, a parser 830, an ad selector 840 and an advertising (ad) server 842. In message flow 800, time flows from the top of the diagram toward the bottom. Message flow 800 may represent messages communicated while video data 132 is received for display on a client device and to retrieve advertising relevant to a user and the video data.

Video display component 812 may represent either of video display component 112 and 412. CC decoder 820 may represent any of CC decoders 320, 420, 520, and 620. Parser 830 may represent any of parsers 330, 430, 530, and 630. Ad selector 840 may represent any of advertising requester 340, 680, advertising selector 540, 640, or ad requesting component 440. Ad server 842 may represent either of ad servers 140 and 642.

Message flow 800 may begin when video data 132 is received by both video display component 812 and CC decoder 820, in messages 802-1 and 802-2, respectively. Video display component 812 and CC decoder 820 may receive messages 802-1 and 802-2 substantially simultaneously, for example, when CC decoder 820 is an component of the client device executing video display component 812. In other embodiments, CC decoder 820 may receive the video data 132 before video display component 812, for example, when CC decoder 820 is a component of a media server.

When CC decoder 820 receives the video data 132, CC decoder 820 decodes the CC data within the video data 132 and produces text. CC decoder 820 may pass the text in message 804 to parser 830.

When parser 830 receives the text from CC decoder 820, parser 830 parses the text into individual words. Parser 830 may discard some words, such as articles, pronouns, conjunctions and prepositions. Parser 830 may also remove any non-ad-relevant words from the text in message 804. Parser 830 may pass all or some of the words to ad selector 840 in message 806.

When ad selector 840 receives the words, ad selector 840 may request an advertisement from ad server 842 in message 808. Message 808 may include all of the words received in message 806. In some embodiments, ad selector 840 may reduce the received words to a set of ad-relevant words and may include only the ad-relevant words in message 808. In various embodiments, ad selector 840 may include only words that occur within a time window in the CC data, as explained in further detail with respect to FIG. 9. Message 808 may also include information about user context, for example, from user context 360, 460, 560, and/or 660-1 and 660-2.

When ad server 842 receives message 808, ad server 842 may select one or more advertisements for display with video data 132. Ad server 842 may use the words and user context, if provided, to select advertisements that are related in some way to the words from the CC data. Ad server 842 may send the one or more selected advertisements in a message 810 to ad selector 840.

Ad selector 840 may pass one or more selected advertisements in a message 812 to the video display component 812 for display with the video data 132. In an embodiment, ad server 842 may send the one or more selected advertisements directly to video display component 812.

Figure 9:
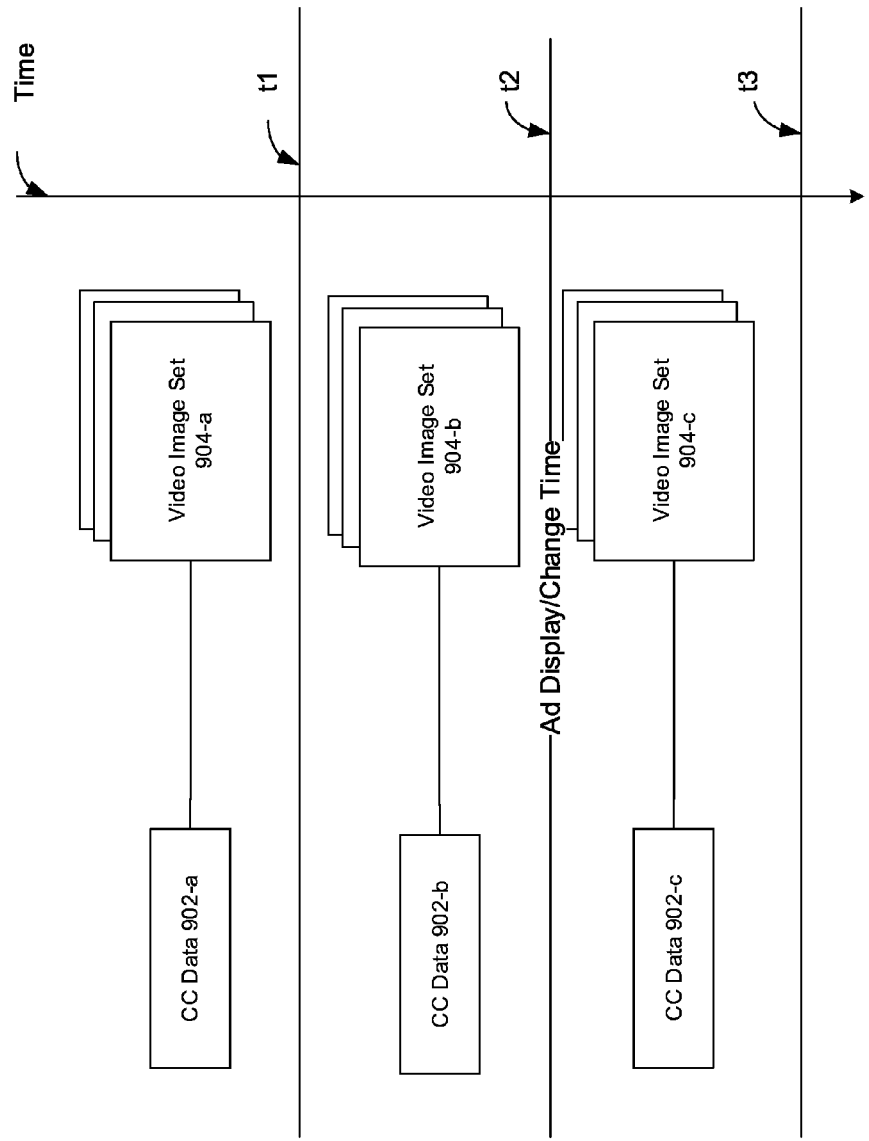
FIG. 9 illustrates an embodiment of a time window

FIG. 9 illustrates an embodiment of a time window 900. In various embodiments, an advertisement may be displayed or changed at specified times or time intervals. Some advertisements may be displayed within the video display, for example, as a commercial break common in broadcast television. Other advertisements may be displayed in the background or in a separate display element. If an ad-relevant word occurs in CC data that is relatively far from an ad change or display time, an advertisement selected from that ad-relevant word may no longer be as relevant by the time it is displayed.

Accordingly, in various embodiments, only CC data from within a time window including an advertisement change or display time may be examined for relevant words and/or context. A time window, such as time window 900, may represent a specific time at which an advertisement will be displayed or changed, and a time period before, during, and after that specific time.

As illustrated in FIG. 9, time increases from the top of the figure to the bottom, and is represented by the time arrow. Time t2 represents the time at which an advertisement will be displayed or changed. Time t1 represents a time before t2 and time t3 represents a time after t2.

As time advances, frames of video data are displayed. For ease of discussion, the frames of video data are grouped into sets according to the time intervals in which they are displayed. For example, video image set 904-*a* comprises frames of video data 132 that are displayed before time t1. Each video image set 904 also includes corresponding CC data. For example, video image set 904-*b* had CC data 902-*b* associated with it. CC data 902-*b* includes all of the CC data contained in video image set 904-*b*.

An advertising selector, such as advertising requester 340, 680, or advertising selector 540, 640, may set or determine a future time t2 for an advertisement to be displayed, and may set or determine a time window 900 that includes the time after (or including) t1 and before (or including) t3. The CC data 902-*a* associated with the video image set 904-*a* which is displayed outside of the time window may be ignored. In some embodiments, the CC data 902-*a* may not be decoded. In some embodiments, the CC data 902-*a* may be decoded but not parsed. In still other embodiments, the CC data 902-*a* may be decoded and parsed, but the words may not be provided to the component selecting an advertisement.

In contrast, the CC data 902-*b* and 902-*c*, associated, respectively, with video image sets 904-*b* and 904-*c*, may be decoded, parsed and used to select an advertisement to display at future time t2.

Figure 10:
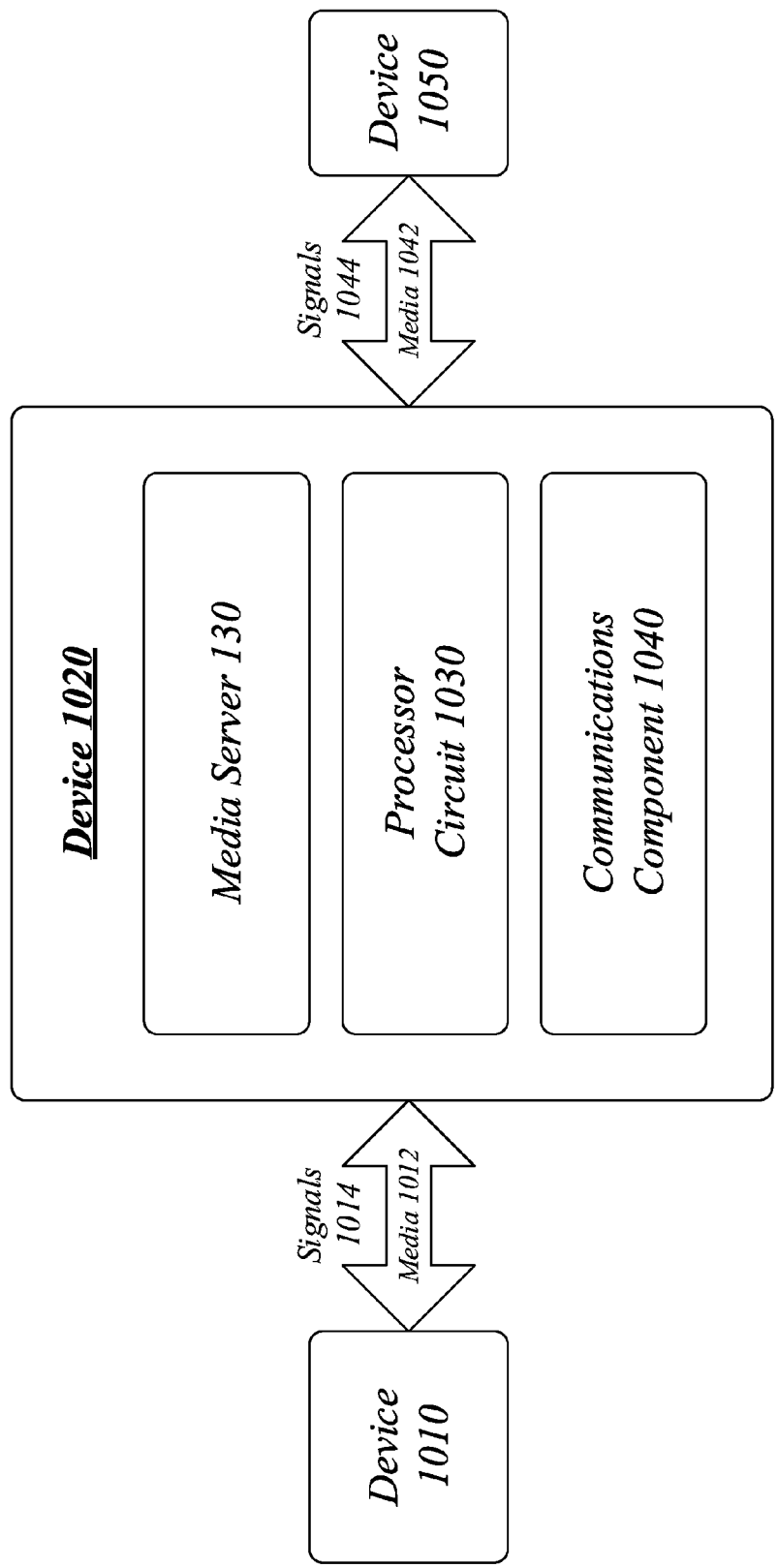
FIG. 10 illustrates an embodiment of a centralized system.

FIG. 10 illustrates a block diagram of a centralized system 1000. The centralized system 1000 may implement some or all of the structure and/or operations for the system 100 in a single computing entity, such as entirely within a single device 1020.

The device 1020 may comprise some or all of the components of media server 130 and may also include a communications component 1040.

The device 1020 may execute communications operations or logic for the system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012, 1042 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1020 may communicate with other devices 1010, 1050 over a communications media 1012, 1042, respectively, using communications signals 1014, 1044, respectively, via the communications component 1040. The devices 1010, 1050 may be internal or external to the device 1020 as desired for a given implementation. Devices 1010, 1050 may include, for example, client devices 110 and advertising servers 140.

Figure 11:
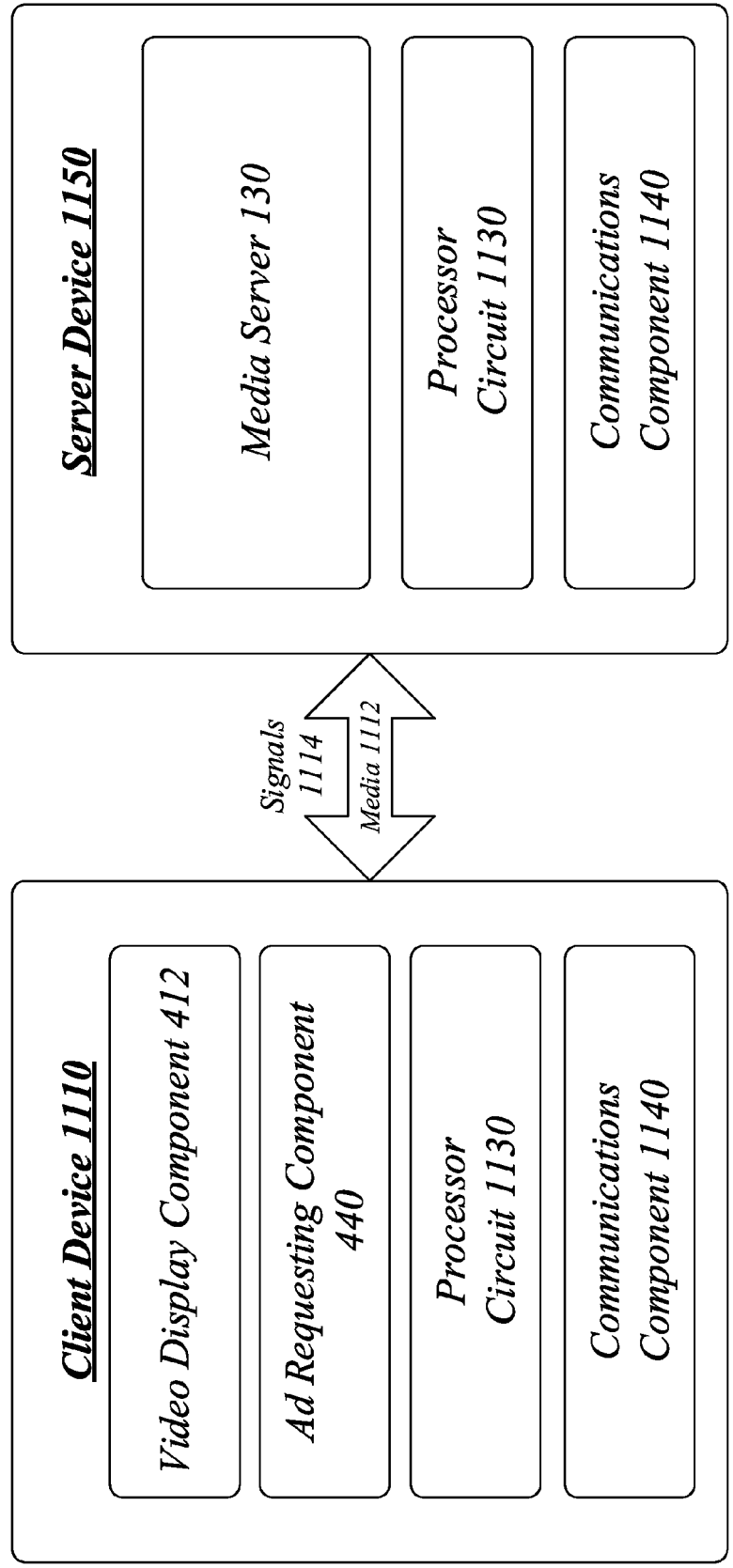
FIG. 11 illustrates an embodiment of a distributed system.

FIG. 11 illustrates a block diagram of a distributed system 1100. The distributed system 1100 may distribute portions of the structure and/or operations for the system 110 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a client device 1110 and a server device 1150. In general, the client device 1110 may be the same or similar to the client device 110, and the server device 1150 may be the same or similar to media server 130, advertising server 140, and/or device 1020 as described with reference to FIGS. 1 and 10. For instance, the client system 1110 and the server system 1150 may each comprise a processing component 1130 and a communications component 1140 which are the same or similar to the processor circuit 102 and the communications component 1040, respectively, as described with reference to FIGS. 1 and 10. In another example, the devices 1110, 1150 may communicate over a communications media 1112 using communications signals 1114 via the communications components 1140.

The client device 1110 may comprise or employ one or more client programs that operate to perform various methodologies in accordance with the described embodiments. In one embodiment, for example, the client device 1110 may implement video display component 412, and/or ad requesting component 440.

The server device 1150 may comprise or employ one or more server programs that operate to perform various methodologies in accordance with the described embodiments. In one embodiment, for example, the server device 1150 may implement at least media server 130. The server device 1150 may also implement some or all of the components of server device 310. The server device 1150 may implement advertising server 140 or 642. Client device 1110 may request video data from server device 1150 and may also receive advertisements to display. Client device 1110 or server device 1150 may decode CC data in the video data for use in obtaining advertisements for display.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
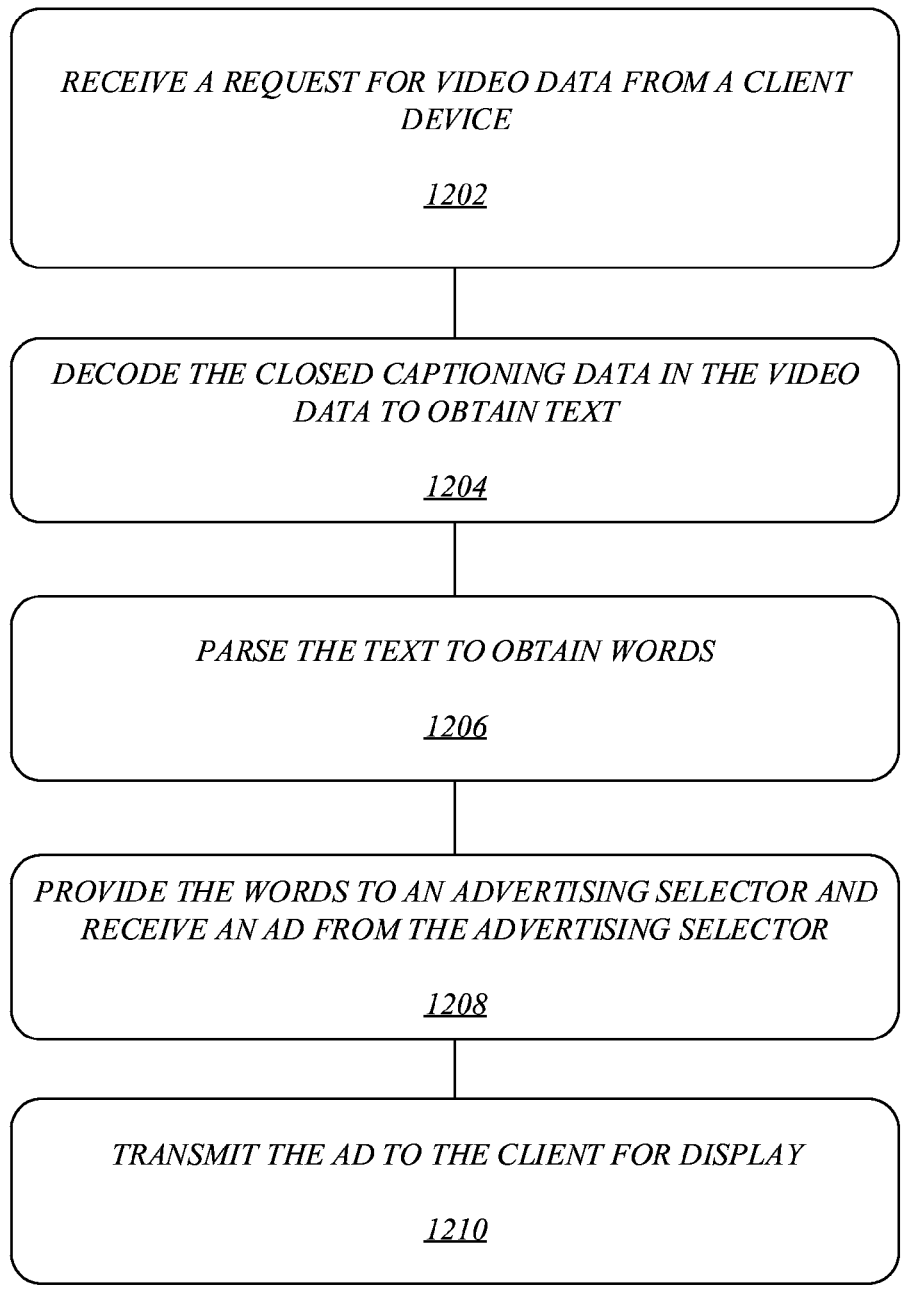
FIG. 12 illustrates a logic flow for the system of FIG. 1.

FIG. 12 illustrates a logic flow 1200. The logic flow 1200 may be representative of some or all of the operations executed by one or more embodiments described herein. In particular, the logic flow 1200 may represent the operations executed by media server 130, server device 310, and/or server device 510.

In the illustrated embodiment shown in FIG. 12, the logic flow 1200 may receive a request for video data from a client device, the video data including closed captioning (CC) data, at block 1202. For example, server device 310 may receive a request from client device 110 for video data 132 when operator 108 chooses to load and play a video served from server device 310 in a video display component 112.

The logic flow 1200 may decode the CC data to obtain text at block 1204. For example, CC decoder 320 may decode the CC data 230 from video data 200 in response to the request for the video data. Server device 310 may also begin transmitting the video data 132 to the requesting client (not shown) before and during the decoding of the CC data. Decoding the CC data may include finding the CC data in the video data, e.g. in the "line 21" data, by identifying a starting point in the line of CC data for each of the two characters in the line, and decoding the bits to characters to retrieve the text.

The logic flow 1200 may parse the text to obtain words at block 1206. For example, parser 330 may parse the decoded text by identifying individual words between blank characters, punctuation characters, and line breaks. In an embodiment, parser 330 may temporarily store the parsed words 332 in a data structure, such as, but not limited to, an array, a list, a database, a spreadsheet, a queue, a set, and so forth. In some embodiments, the parser 330 may selectively discard some words, such as articles, pronouns, conjunctions, prepositions and other words that typically do not convey information alone. Parser 330 may also discard words that are not ad-relevant and retain ad-relevant words.

The logic flow 1200 may provide the words to an advertising selector and receive an advertisement from the advertising selector at block 1208. For example, advertising requester 340 may send a request to an advertising server for an advertisement. The words from parser 330 may be included in the request to allow the advertising server to select advertisements that are relevant to the video content. In some embodiments, user context may also be provided to the advertising server. In some embodiments, an advertising selector may select an advertisement directly, for example, if the advertising selector is operating within an advertising server.

The logic flow 1200 may transmit the advertisement to the client device for display at block 1210. For example, the video display component 112 may receive the advertisement and may display it in a user interface, such as UI 700, in the video itself, in an ad insert component, or as a background.

Figure 13:
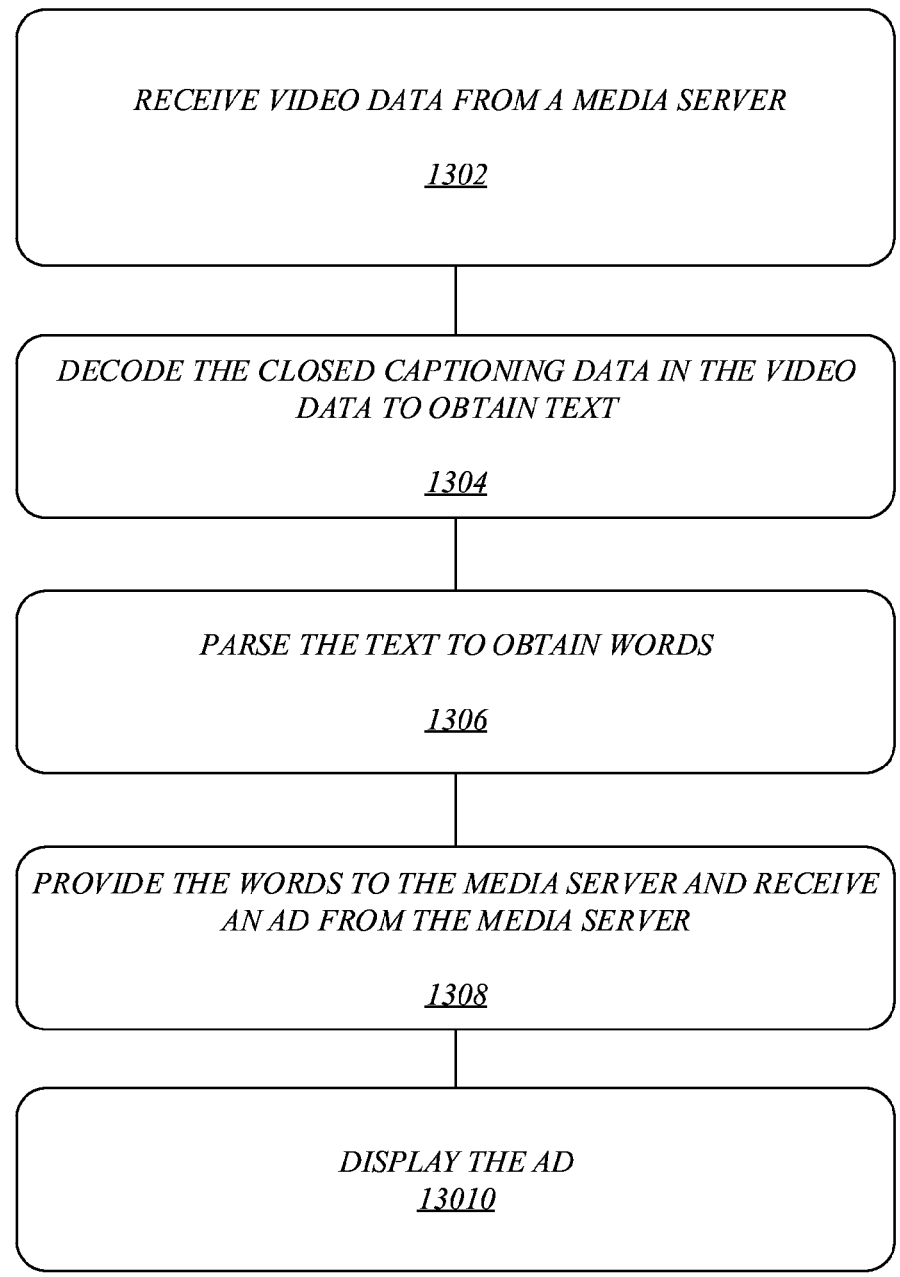
FIG. 13 illustrates a second logic flow for the system of FIG. 1.

FIG. 13 illustrates a second logic flow for the system of FIG. 1. The logic flow 1300 may be representative of some or all of the operations executed by one or more embodiments described herein. In particular, the logic flow 1300 may represent the operations executed by client device 110 or client device 410.

In the illustrated embodiment, shown in FIG. 13, the logic flow 1300 may to receive video data from a media server at block 1032. The video data may include closed captioning (CC) data. Video display component 412 may receive the video, after requesting it, and may display it, for example, in video data display component 720 of UI 700.

The logic flow may decode the CC data to obtain text at block 1304. For example, CC decoder 420 may decode the CC data present in the received video data. Block 1034 may operate similarly to block 1204.

The logic flow 1300 may parse the text to obtain words at block 1306. For example, parser 430 may separate the text into discrete words as previously described with respect to parser 330 and block 1206.

The logic flow 1300 may provide the words to the media server and receive an advertisement from the media server at block 1308. For example, ad requesting component 440 may send the words to the media server 130 with a request for an advertisement. In some embodiments, information from user context 460 may also be included in the request. The media server may select and provide an advertisement, or may request an advertisement from an advertising server, according to the words, and context when provided.

The logic flow 1300 may display the advertisement at block 1310. For example, video display component 412 may receive the advertisement and may display it in a user interface, such as UI 700, in the video itself, in an ad insert component, or as a background.

Figure 14:
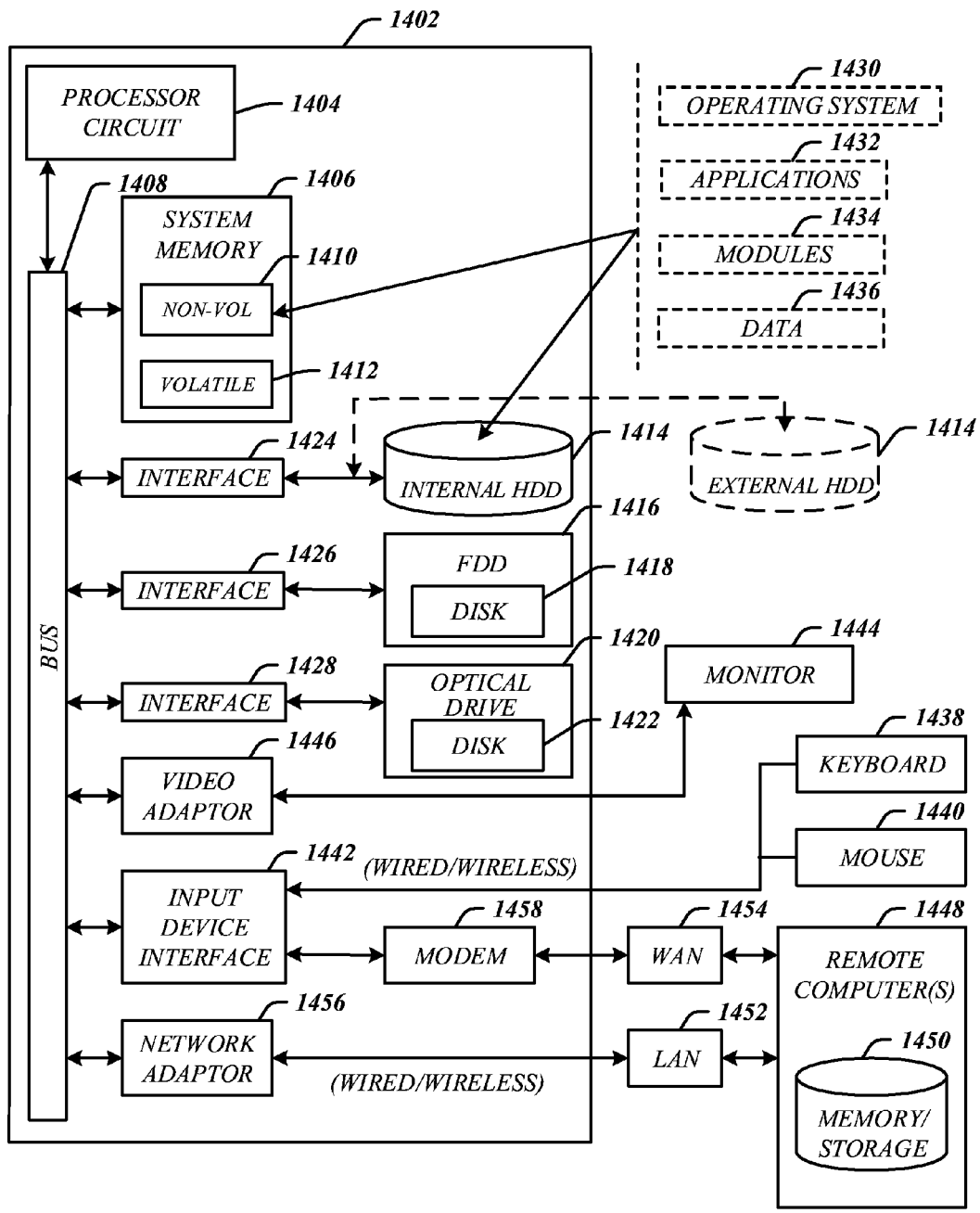
FIG. 14 illustrates an embodiment of a computing architecture.

FIG. 14 illustrates an embodiment of an exemplary computing architecture 1400 suitable for implementing various embodiments as previously described. In one embodiment, the computing architecture 1400 may comprise or be implemented as part of an electronic device. Examples of an electronic device may include those described with reference to FIGS. 1 and 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1404.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1410 to read from or write to a removable optical disk 1422 (e.g., a CD-ROM or DVD). The HDD 1414, FDD 1416 and optical disk drive 1410 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1494 interface technologies.

The drives and associated computer-readable storage media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the system 100.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1494 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
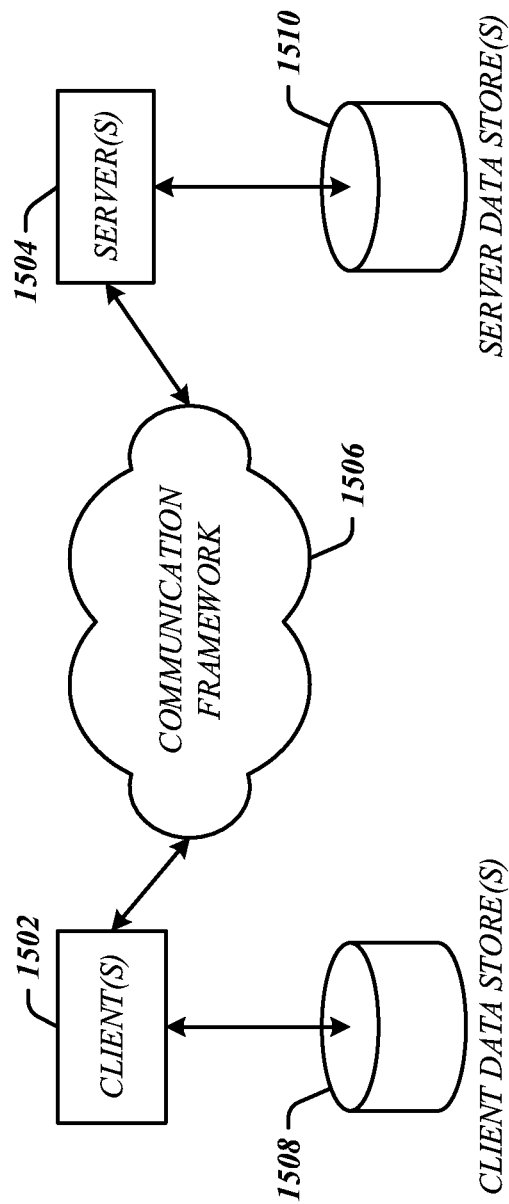
FIG. 15 illustrates an embodiment of a communications architecture.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 comprises includes one or more clients 1502 and servers 1504. The clients 1502 may implement the client device 110. The servers 1504 may implement the server device 130. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information between each other using a communication framework 1506. The communications framework 1506 may implement any well-known communications techniques and protocols. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
   a processor circuit; and
   a video display component for execution on the processor circuit to receive video data from a media server, the video data including closed captioning (CC) data;
   a CC decoder component for execution on the processor circuit to decode the CC data to obtain text; and
   an ad requesting component for execution on the processor circuit to:
      determine a future time to display an advertisement;
      set a time window including the future display time for the advertisement,
   a first time period before and adjacent to the future display time, a second time period during the future display time, and a third time period adjacent to and after the future display time, the time window comprising less time than an entirety of running time of the video data;
      select a subset of the video data that will be displayed during the time window;
      parse the text from the CC data corresponding to the subset of video data to obtain words;
      provide the words to the media server;
      receive an advertisement from the media server; and
      display the advertisement.

2. The apparatus of claim 1, the ad requesting component to display the advertisement in one of: a background behind a display of the video data; an ad insert component separate from the background and from a display of the video data; and an insertion into the video data.

3. The apparatus of claim 1, the ad requesting component to select ad-relevant words from the obtained words; and provide the ad-relevant words to the media server.

4. The apparatus of claim 3, the ad requesting component to obtain a user context for a user requesting the video data; and
   use the user context to select the ad-relevant words.

5. The apparatus of claim 1, the ad requesting component to obtain a user context for a user requesting the video data; and
   provide the user context to the media server with the obtained words.

6. The apparatus of claim 5, the ad requesting component to obtain the user context from at least one of: social network data from the user; and browser history data.

7. A computer-implemented method, comprising:
   receiving a request for video data from a client device, the video data including closed captioning (CC) data;
   determining a future time to display an advertisement;
   setting a time window including the future display time for the advertisement, a first time period before and adjacent to the future display time, a second time period during the future display time, and a third time period adjacent to and after the future display time, the time window comprising less time than an entirety of running time of the video data;
   selecting a subset of the video data that will be displayed during the time window;
   decoding the CC data for the subset of video data with a processor circuit to obtain text;
   parsing the text to obtain words;
   providing the words to an advertising selector;
   receiving an advertisement from the advertising selector; and
   transmitting the advertisement to the client device for display.

8. The computer-implemented method of claim 7, comprising transmitting the advertisement for display in at least one of:
   a background behind a display of the video data;
   an ad insert component separate from the background and from a display of the video data and
   an insertion into the video data.

9. The computer-implemented method of claim 7, comprising:
   selecting ad-relevant words from the obtained words; and
   providing the ad-relevant words to the advertising selector.

10. The computer-implemented method of claim 9, comprising:
    obtaining a user context for a user requesting the video data; and
    using the user context to select the ad-relevant words.

11. The computer-implemented method of claim 7, comprising:
    obtaining a user context for a user requesting the video data; and
    providing the user context to the advertising selector with the obtained words.

12. The computer-implemented method of claim 11, comprising:
    obtaining the user context from at least one of:
    social network data from the user;
    user demographic data about the user;
    companion content on a web site displaying the video data; and
    browser history data.

13. At least one computer-readable storage memory unit comprising instructions that, when executed, cause a system to:
    determine a future time to display an advertisement;
    set a time window including the future display time for the advertisement, a first time period before and adjacent to the future display time, a second time period during the future display time, and a third time period adjacent to and after the future display time, the time window comprising less time than an entirety of running time of the video data;
    select a subset of video data that will be displayed during the time window;
    decode close captioning (CC) data from the subset of video data to obtain text;
    parse the text to obtain words;
    select an advertisement according to the words; and
    transmit the selected advertisement to a client device for display, wherein the client device is also displaying the video data.

14. The computer-readable storage medium of claim 13, comprising instructions that when executed cause the system to:
  select ad-relevant words from the obtained words; and
  use the ad-relevant words to select an advertisement.

15. The computer-readable storage medium of claim 14, comprising instructions that when executed cause the system to:
  obtain a user context; and
  use the user context to select the ad-relevant words.

16. The computer-readable storage medium of claim 13, comprising instructions that when executed cause the system to:
  obtain a user context for a user of the client device displaying the video data; and
  use the user context to select an advertisement.

17. The computer-readable storage medium of claim 16, comprising instructions that when executed cause the system to:
  obtain the user context from at least one of:
  social network data from the user;
  user demographic data about the user;
  companion content on a web site displaying the video data; and
  browser history data.

18. The apparatus of claim 1, the ad requesting component further to:
  select a meaning for a parsed word having a plurality of meanings, wherein each of the plurality of meanings is associated with a different set of metadata, wherein the set of metadata for the selected meaning includes a word present in the decoded CC data near the parsed word.

* * * * *